Figure 1:
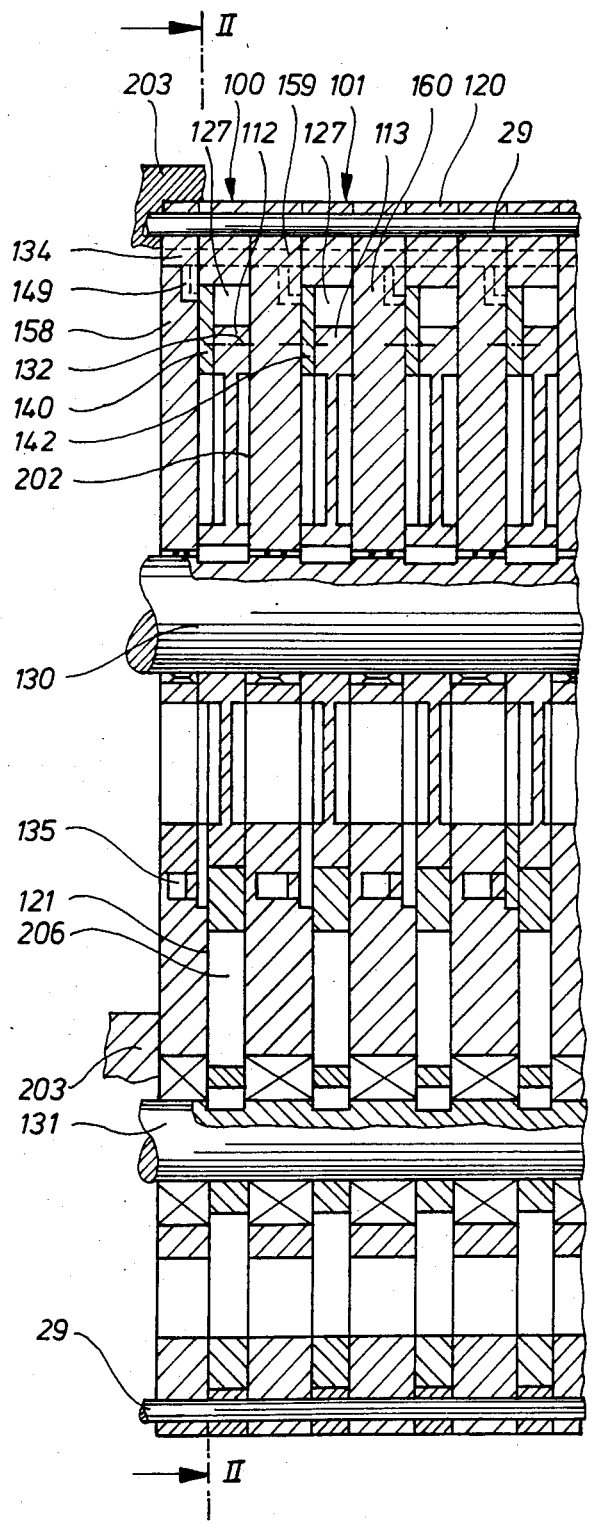

United States Patent [19]

Zimmermann

[11] Patent Number: 4,696,268

[45] Date of Patent: Sep. 29, 1987

[54] ROTARY PISTON INTERNAL COMBUSTION ENGINE WITH WATER INJECTION

[76] Inventor: Otto Zimmermann, Lehenweg 4, Hard, Austria, 6971

[21] Appl. No.: 745,243

[22] Filed: Jun. 13, 1985

[30] Foreign Application Priority Data

Jun. 16, 1984 [DE] Fed. Rep. of Germany ....... 3422487

[51] Int. Cl.$^4$ ........................................... F02B 53/00
[52] U.S. Cl. ................................... 123/203; 123/249; 418/97
[58] Field of Search ............... 123/203, 215, 238, 246, 123/249; 418/97, 191

[56] References Cited

U.S. PATENT DOCUMENTS

| 1,101,794 | 6/1914 | Friend | 123/203 X |
| 1,155,335 | 10/1915 | Bricknell et al. | 123/246 |
| 2,447,929 | 8/1948 | Berry | 123/238 X |
| 3,852,001 | 12/1974 | Miller | 418/196 |

FOREIGN PATENT DOCUMENTS 23529 2/1981 European Pat. Off. .
116356 8/1984 European Pat. Off. .

Primary Examiner—Michael Koozo
Attorney, Agent, or Firm—Larry J. Palguta

[57] ABSTRACT

A rotary piston machine consisting of several circular, axially in series, on a shaft mounted, piston rotors, each piston rotor having a piston running along an associated, stationary working chamber wall of a circular cylindrical working chamber and being in mating engagement wich a recess in at least one shut-off rotor in rolling contact with the piston rotor, and, wherein the shafts of the piston rotor and the shut-off rotor are coupled to each other by means of coupling gears, and in which the gaseous high-expanded and combustible medium is admitted to and discharged from the respective working chamber by one or more rotary valve rotating with said shaft. The rotary piston machine as a combustion steam motor operates such that, after ignition of the combustible operating medium, water is injected into the working chamber by means of one or more injection nozzles distributed around the inner circumference of said working chamber wall.

10 Claims, 2 Drawing Figures

ROTARY PISTON INTERNAL COMBUSTION ENGINE WITH WATER INJECTION

The invention relates to a rotary piston machine with several circular, axially in series, on a shaft mounted piston rotors, of which each one has a piston, which runs along an associated stationary wall of a circular cylindrical working chamber and which is in mating engagement with a recess in at least one shut-off rotor having rolling contact with the circumference of the piston rotor, the shafts of the piston rotor and the shut-off rotor being interconnected by coupling gears, and the gaseous medium admitted to and discharged from the respective working chamber by means of one or more rotating rotary valves.

A rotary piston machine as described above has become known, for instance, from the subject matter of EP No. 0023529 A2. In this known rotary piston machine, following a main stage is a so-called waste gas or exhaust stage. The working medium is admitted to and discharged from the respective working chamber by means of a rotary valve which is rotatably driven by the shaft of the shut-off rotor. In this mentioned publication, it is merely stated how the inlet and outlet slots of the rotary valve are opened and closed synchronous with the rotation of the shut-off rotor. In which which way the operating medium is admitted to and discharged from the working chamber, however, is not stated there.

The efficiency of such a rotary piston machine requires substantial improvement, because, roughly calculated, one third of thermal energy is transferred to the cooling water and wasted, and, a further third is unused and discharged via the exhaust stage.

The rotor of the present invention is comparable with a turbine. Contrary to a turbine, however, here there is effective not only the resulting force of the jet stream pressure, but also the full force of the static pressure within the always closed combustion and working chambers.

While in a turbine the pressure jet flow takes a rather straight path, the flow in a rotor arrangement describes a spiral path. The operation is controlled by control or timing discs. Except for the first stage of the compressor, negative pressure or vacuum is not used in operation. Used and unused or fresh media never collide within the same chamber, but, they are spatially and precisely separated from each other. From the inlet all the way through to the exhaust, the always in one direction flowing gases cover a distance of several meters, and, in one of the embodiments, travel for approximately 16 cycles.

The rotational speed, based on the number of operation cycles (ignitions) is half of that of an Otto engine. The number of revolutions from 500 to 6,000 rpm would correspond with 1,000 to 12,000 rpm of an Otto engine. As there are no valves present and supercharging with air is compulsory, markedly higher numbers of revolutions could be achievable. Thus, the speed range is wide.

Owing to said compulsory charging with air, the pressure within the combustion chamber prior to ignition is always constant, i.e., the pressure is not decreasing with increasing speed, and this accomplishes from the outset an output of an engine having a supercharger. According to the present invention, the pistons operate always on two sides, i.e., said pistons are going to be subjected to pressure on one side, and, with the other side apply pressure to a succeeding piston. A machine of this type is especially suitable for the well known method of water injection into the working or inner chamber of a piston rotor.

It is therefore an object of the present invention to further develop a rotary piston machine of a type described above and not prepublished, such that among other things the thermal efficiency is substantially improved.

To solve the problem posed, the invention is characterized in that the rotary piston machine as a combustion steam motor operates such that, after ignition of the combustible working medium, water is injected into the working chamber by means of one or more injection nozzles distributed around the inner circumference of the working chamber wall.

An essential feature for improving the thermal efficiency is that the injection of water takes place during the working stroke of the rotary piston machine.

On the one hand, the termally highly stressed parts within the working chamber become cooled, which results in that the permissible pressures can be increased up to a maximum without danger of thermal damage to these parts. On the other hand, the efficiency becomes substantially improved, because, the combustion heat developing within the working chamber acts upon the injected water such that it becomes converted to steam (vaporizes), and, by this the working pressure within the combustion chamber increases substantially, by which the output becomes increased too.

Thus, there in on one hand a cooling of thermally highly stressed parts, and, on the other hand a pressure increase within the working chamber, which leads to a higher thermal stress of the parts within the working chamber, which, however, become cooled by water injection. In order to achieve a complete combustion, the invention provides that, based on the ignition point, a first water injection nozzle is offset such that the mixture already is completely burnt before water is injected into the working chamber. The complete combustion of the mixture results in lower poisonous exhaust gases, while with the following water injection an additional decontamination of the discharged exhaust gases is achieved.

An air pressure within the combustion chamber, still adjustable as desired by the design, does not only help to improve vaporization and combustion of the injected fuel in the air stream passing by, but, beyond that, increases the output of the motor substantially. As always, only air is to be precompressed, and any undesired self-ignition cannot occur. The mode of operation of the rotor is always that of injection self-ignition of a diesel engine. Knocking does not occur because the explosion blast strikes on a quickly moving piston.

The compressor part is configured such that with increasing gas pressure the work area of the pistons becomes step-wise smaller. The generated pressure acts with the smaller work area in direction compression. The peaks of power demand become cut off and uniformly distributed through the revolutions. In this manner, high end pressures are reached much easier, and the end pressures once reached do not act against the direction of rotation anymore, and, therefore, do not put any strain on the motor.

A six "cylinder" rotary machine would, in comparison, correspond to a 24-cylinder Otto motor with the same number of revolutions, based on angular staggering and operating cycles, but would have only two moving parts constantly rotating concentrically around their axis, contrary to an Otto motor which would consist in this case of numerous reciprocating members.

The long mode of operation after ignition could be also considered disadvantageous in relation to that of the Otto motor if there would not be provided insulation and cooling in the interior of the working chamber. Advantageous in this case is the provision of a large surface area, which allows better diversion of heat from the walls by the injected water. The developing water vapor increases the pressure in said working chamber, which is to be used to add to the driving power. Therefore, one third of the energy is not wasted by diversion into cooling water, but used for increasing the driving power and multistaged, by which steam becomes discharged through the exhaust and having merely a low-graded energy content. Even losses normally occurring in the exhaust part (one third) are mostly eliminated. The distribution of energy has basically changed.

As pressure sets on always at the long lever arm end (12-14 cm), and, as it is law of nature that pressure has a high velocity of propagation, the moment of rotation is favorable. This applies also to the output, as each one of the revolutions means one working cycle, and that of 270° respectively 540° instead only 180°.

Further, the Otto motor, having a seven-fold increases volume, yields an angular drive of around 90°, while with a rotor the same increase of volume results in 210°.

According to the invention, water injection is accomplished via a first injection at a position at which the piston is approximately opposite the injection nozzle, and said piston becomes additionally cooled by water injection.

It is preferred that in the wall of the working chamber a first injection nozzle and further injection nozzles are provided, and distributed quidistantly to each other around the inner circumference of said wall, and in which a second and third injection nozzle are each arranged offset 30° consecutively in the direction of rotation starting from said first injection nozzle, and, wherein a fourth injection nozzle is provided at a position approximately 2° to 5° ahead of the ignition point, which does operate only periodically in accordance with the water demand.

For further details regarding the operation of the present rotary piston machine as a combustion machine, reference is made to the European patent application EP No. 0116356 of same applicant, which, however, is not made public prior to the present application.

The present rotary piston machine operates in a mode like a diesel engine, so that in the present case this machine is to be characterized as a rotary piston combustion steam motor.

Herein it is presupposed that a combustion mixture is admitted into the working chamber, and, that ignition takes place within a closed working chamber is such way that said piston is advancingly driven.

The compressed mixture is admitted by means of respective control or timing discs in a second stage of the multi-stage rotary piston machine because in this working chamber ignition also takes place, by which the piston of this stage, with the rotor, is advancingly drive in the direction of rotation. These individual in series placed stages of the multiple stage design of this rotary piston machine supplement and support each other, which results in a never-known running comformability.

A preferred design provides for six working stages in such rotary piston machine arranged in series. Following these six stages an exhaust stage may be added which is not producing a combustible mixture anymore, but, in which position only the exhaust gas is used for driving the piston of this stage, which is non-rotationally connected to the piston rotor.

Also for this exhaust stage a water injection is provided analogous to the one herein described already. On the one hand, this arrangement provides again a cooling down of the exhaust stage, resulting in heating up the injected water used for heat transfer, and, on the other hand it achieves with said water injection a pressure increase.

In order to achieve a good thermal efficiency and for lowering the CO-NH as well as NOX parts, it is important that water is fed finely dispersed in the gas-air mixture flow. For this purpose, the embodiment of a rotary piston machine according to the present invention is extraordinaryly suitable. The medium, into which water is injected, is passed along with a high velocity, is practically free of turbulences, and is uniform in flow.

The injection according to the present invention is provided perpendicularly in relation to the direction of medium flow, by which similar to the principle of water jet pump, the water is drawn off from the injection nozzle by developing negative pressure and becomes, by means of a respective formed edge, superfine atomized waste fed into the flow at the injection nozzle.

The present invention is not restricted just to the individual subject matters of the patent claims, but claims also combinations of these individual claims.

All data and features disclosed in the documents, especially the spatial embodiments shown in the drawings, are claimed as essential to the invention to that extent as they are new in relation to the prior art.

The present invention is explained below in greater detail with reference to the attached drawings illustrating a preferred embodiment. The drawings and their description will reveal further features and advantages essential for this invention.

Figure 2:
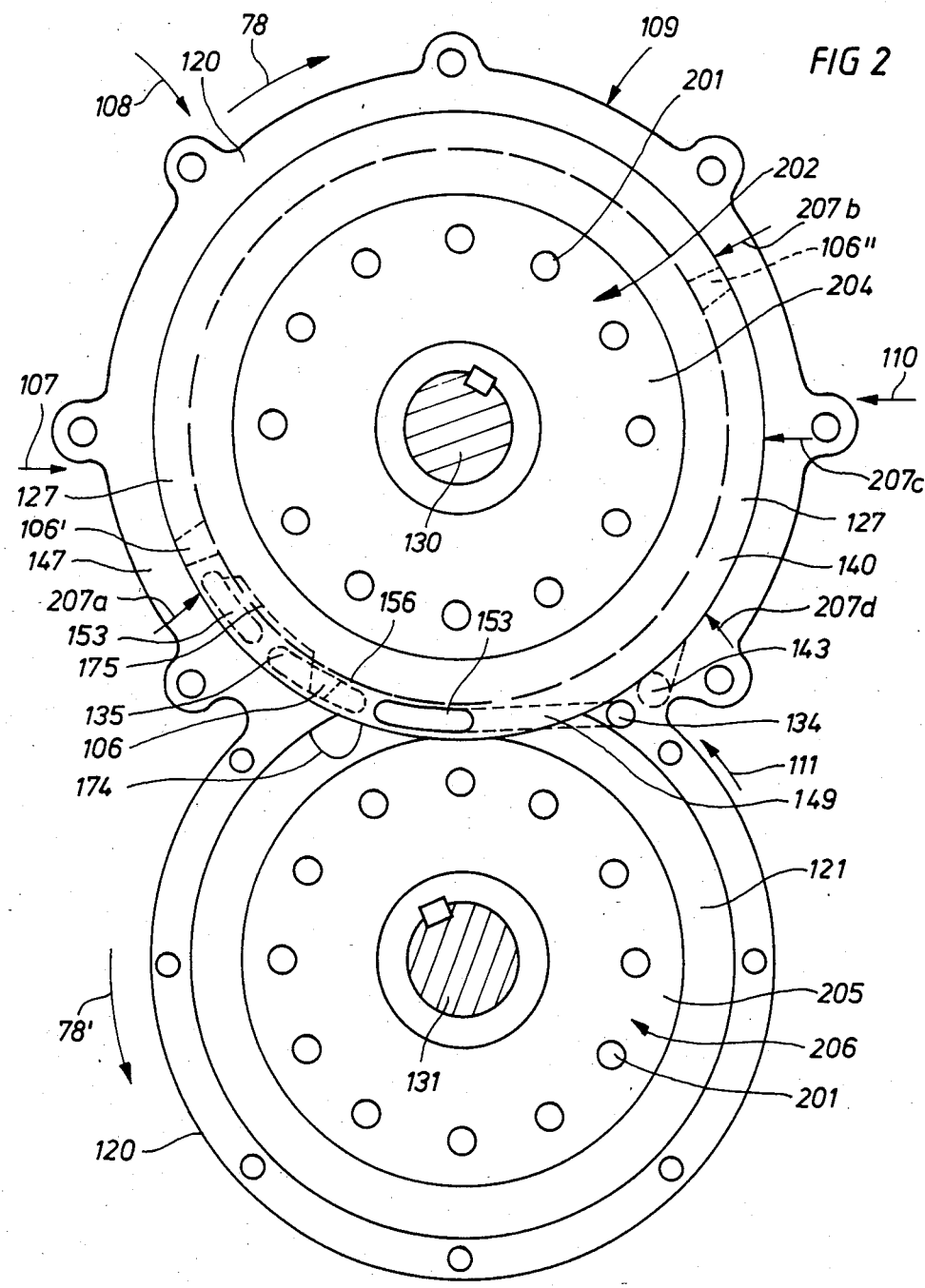

In the attached drawings:

FIG. 1 is a center longitudinal section of a rotary piston machine according to the present invention and having four stages in series, and FIG. 2 is a sectional view along view line II—II of FIG. 1.

According to FIG. 1, there is provided a machine housing 120, held together by screws 29, which includes for instance four different expansion stages of the rotary piston machine, serially arranged in packages. Each one of the expansion stages is equipped with a piston rotor 112, 113 with pistons 106 (FIG. 2) non-rotationally mounted to it and radially projecting outwardly. The pistons of successive expansion stages 100, 101 an so on are offset to each other by an angle of 60°, based on a successive arrangement of a total of six expansion stages accommodated in said machine housing 120. Since the expansion stages 100, 101 have equal structures, the embodiment of FIG. 1 shows for example merely four expansion stages, so that only the first two successive expansion stages 100 and 101 are described in detail.

In FIG. 2, there are numbered indicating arrows for each spot of the shut-off rotor where each one of the pistons 107, 108, 109, 110, 111 is connected with the associated piston rotor. Out of this can be gathered the offset of 90° in the direction of rotation.

Piston 106 of the first expansion stage 100 is sealing with not further described sealing means at the wall of the associated working chamber 127. The associated piston rotor 112 is non-rotationally connected with the motor shaft 130 by means of a tongue and groove arrangement. The motor shaft 130 is rotatably supported in the machine housing 120 by means of ball bearings. Inside the piston rotors 112, 113 are discs 204 which connect the respective piston rotor 112,113 with the associated shaft 130. Each one of said discs is provide with bores 201, and an inner space 202 between the shut-off rotor and motor shaft, i.e. a space within which disc 204 is arranged, is filled with oil. By this means a lubricating oil film provides for better sealing.

The lower part of the working chamber 127 is sealingly confined by shut-off rotor 121, which is by means of a tongue and groove arrangement non-rotationally attached to a second shaft 131. Each shut-off rotor 121 is via an associated disc 205 connected with the shaft 131. Said disc 205 is provided with bores 201. Also the inner space 206 is analogous to the inner space 202 of the piston rotor 112 filed with oil, by which sealing and lubrication is achieved.

The shaft 131 of the shut-off rotor 121 is coupled synthroneously in rotation with said shaft 130 of the piston rotor 112 by means of not in detail described gears.

To each front face of the respective working chamber 127 an associated control or timing disc 140 is attached, which arrangement is illustrated in FIG. 1 only by one control or timing disc 140 of the first expansion stage and one inlet control or timing disc 142 of the second expansion stage.

Each one of the control or timing discs 140, 142 is connected to the front face of the associated piston rotor 112, 113 by means of connecting bolts 132. The control or timing discs 140,142 confine in housing 120 connecting and transfer canals or ports 134,135. The parting walls 158, 159, 160 are penetrated by an axially through extending connecting canal 134, from which are branched off knee-shaped branch canals 149, which end in associated transfer canals 135. Hereto, it is pointed out that in FIG. 1 for reasons of clarity the connecting canal 134 together with the associated branch canals 149 are shown in the upper part of the drawing in broken lines, although—as in FIG. 2 shown—the transfer canals are located in the central portion of the machine housing 120. In other words, the representation in broken lines in the upper part of FIG. 1 involves a schematic outlay intended to make the function of the subject matter of this invention more understandable.

FIG. 2 shows a frontal view of the first expansion stage 100. In this schematic illustration, the piston 106 of the first expansion stage 100 is shown in two different successive periods of time, wherein the piston is rotating in the direction of arrow 78, and, its timely following position is indicated by reference numeral 106'.

In FIG. 2 also schematically illustrates that the other pistons 107–111, in relation to piston 106 of the first expansion stage 100, are angularly offset by an angle of 60° from piston to piston.

Sealing or shut-off of the working chamber 127 of the first expansion stage 100 is accomplished by means of the shut-off rotor 121, which is rotating in direction of arrow 78'. The recess 174 in the shut-off rotor 121 is utilized to make it possible for piston 106 of the piston rotor 112 to move past the shut-off rotor 121.

In the position shown in FIG. 2, the piston 106 of the piston rotor 112 has just left bottom dead center. Through the transfer canal 143 the burned bases first reach the exhaust section (not shown) by means of the inlet control or timing disc 140, gas flows into the working chamber 127 through the connecting canal 134. All other working chambers of the remaining expansion stages are mixed with combustible gas in the same manner.

The type of fuel which is going to be used is, for the function of the present invention, not important.

This gas (operating medium) comes from a line-up compressor which has a compression ratio of approximately 1:20. A compressor of a type known from the referenced EP No. 0116356 of same inventor may be utilized.

The air compressed by said compressor reaches the working chamber 127 of the first expansion stage 100 through the connecting canal 134, the knee-shaped branch canal 149, the overflow or transfer canal 135, and port 153 in the control or timing disc 140.

This transfer is shown in FIG. 2 shortly before it starts, i.e., the transfer starts only when the port 153 in the control or timing disc 140 intersects the transfer canal 135 in the parting wall 158.

As soon as the rear edge of the port 153 in the inlet control or timing disc 140 leaves what in the direction of rotation is the leading edge of the overflow or transfer canal 135, the inflow process into the working chamber 127 is concluded, and at the site of the injection nozzle 147 a fuel, such as diesel fuel, is injected.

A combustion now takes place within the combustion chamber 127, during which the piston is located in the position indicated by 160'. It is thereby driven forward in the direction of rotation indicated by arrow 78, and turns to the position of piston 111, from where the gas expanded in working chamber 127 flows through the transfer canal 143 into the working chamber of the exhaust section, with the inlet control or timing disc 140 being open.

As soon as the rotating piston 106 has passed the overflow or transfer canal 143 for the exhaust, recess 175 opens the connection to the working chamber 127 so that the same pressure prevails in the whole working chamber 127. Only when the piston 106 is continuously turning in direction of arrow 78, and only when the backside of the piston 106 again mates with the shut-off rotor 121, are the working chambers, separated by piston 106, separated from each other.

It is further indicated that there is provided, in an operational direction behind the respective piston 106, a flushing hole 156 behind the respective inlet control or timing disc (in the present embodiment behind the inlet control or timing disc 140). The purpose of this flushing hole 156 is to flush the residual gases out of the working chamber 127, because at the point of time when the piston 106 is in the area of the recess 174, the flushing hole 156 coincides with a not in detail described port in the associated parting wall, which is communicating with the transfer canal 134.

After a full revolution of piston 106 as described herein, the following description deals with the inventive water injection system.

As already mentioned, ignition of the combustible mixture inside the working chamber 127 occurs in a position when the piston has taken a position indicated by reference numeral 106'. The piston is driven advancingly by the expansion of the burned gases and reaches, after turning around approximately 180°, a position opposite the injection nozzle 207b, where said piston takes the position indicated by reference numberal 106".

Water is then injected into the working chamber simultaneously from all four locations of the injection nozzles 107a, b, c and d. Since the working chamber is intensively heated up, the water injected by the injection nozzle 207a vaporizes in the working chamber and increases the pressure therein. With the injection nozzle 207b in a location behind the piston 106", the pressure in the working chamber becomes again increased by injection of water through said injection nozzle 207b.

In front of the piston, injection nozzle 207c injects water, and also injection nozzle 207d injects water, which together also build-up a pressure in front of the piston. This pressure in front of the piston, however, escapes at once through the overflow or transfer canal 143 associated with the exhaust portion, so that the movement of the piston is in no way braked or even obstructed by this.

By means of the injection nozzle 207d, which is located immediately in front of the shut-off rotor 121, the advantage is achieved in that the shut-off rotor itself is cooled by water.

The injection of water by the injection nozzle 207a has to terminate when the piston is passing the injection nozzle 207a, since the combustion chamber must be kept free from water in order to ignite the combustible material thereafter.

The amount of water to be injected depends on test conditions, and can be determined by trials.

It is also possible to inject water into the not in detail illustrated exhaust section, which has the same structure as the herein described expansion stages. There is the advantage that by this means the exhaust gases become substantially cooled down and decontaminated. The water vapor discharged from this exhaust section will then become recooled and brought to condensation in a separate exchanger unit, by which the water can be reused in a water injection circuit. This has another advantage in that this water is preheated by which the thermal efficiency of the present machine can be further increased.

The machine housing is covered by a heat insulating layer 203 in order to avoid any not-desired escape of heat to the outside.

What is claimed:

1. A rotary piston machine of a combustion motor having pistons on rotating piston rotors and associated circular working chambers each defined circumferentially behind an associated piston in a direction of rotation of the associated rotor, the piston rotors attached to a shaft and each piston aligned for mating engagement with a recess in at least one shut-off rotor engaging circumferentially a respective piston rotor, the shaft of the piston rotors and a shaft of the shut-off rotor interconnected by coupling gears, rotary valves connected with the shaft of the piston rotors in order to effect admission and discharge of a fuel mixture for the working chambers, the fuel mixture being injected in each working chamber and ignition causing an expansion phase therein of the fuel mixture, and in each working chamber injection of water being provided during the expansion phase characterized in that the machine includes four water injection nozzles, a first of said nozzles is positioned circumferentially at a location corresponding to the position of the piston near the beginning of the expansion phase, and a second of said nozzles is positioned circumferentially at a location corresponding to the position of the piston near the end of the expansion phase, such that each of the first two water injection nozzles injects water following movement of the respective piston past each of the first two water injection nozzles, and the other two water injection nozzles are positioned circumferentially downstream of the first two water injection nozzles in the direction of rotor rotation to inject water before movement of the respective piston past the other two water injection nozzles.

2. The rotary piston machine according to claim 1, characterized in that one of the first two water injection nozzles is positioned 2 to 5 degrees circumferentially in front of a fuel injection nozzle.

3. The rotary piston machine according to claim 1, characterized in that one of the first two water injection nozzles has a duration of water injection corresponding to approximately half a rotation cycle of the respective piston.

4. The rotary piston machine according to claim 1, characterized in that the other two water injection nozzles are arranged and distributed at the perimeter of a working chamber following the respective expansion phase and rotational travel of the respective piston of approximately 180 degrees.

5. The rotary piston machine according to claim 1, characterized in that the other of the first two water injection nozzles and the other two water injection nozzles inject water continuously until the end of the respective expansion phase.

6. The rotary piston machine according to claim 1, characterized in that an effective expansion phase of the fuel mixture is twice 270 degrees during one rotation of a piston.

7. The rotary piston machine according to claim 1, characterized in that a housing of the rotary piston machine includes a heat insulating layer.

8. The rotary piston machine according to claim 1, characterized in that the machine includes disk-shaped inner spaces filled with oil and disposed between the working chambers and the shaft.

9. The rotary piston machine according to claim 1, characterized in that the water is injected perpendicularly relative to a direction of travel of the fuel mixture in a working chamber.

10. The rotary piston machine according to claim 1, characterized in that an exhaust section of the motor includes water injection nozzles.

* * * * *